(12) United States Patent
Wong

(10) Patent No.: US 8,988,872 B2
(45) Date of Patent: Mar. 24, 2015

(54) CRADLE FOR A PORTABLE DEVICE HAVING A CONNECTOR ROTATABLY MOUNTED ON A BASE

(75) Inventor: Kwok Yeung Wong, Eindhoven (NL)

(73) Assignee: Woox Innovations Belgium NV (BE)

( * ) Notice: Subject to any disclaimer, the term of this patent is extended or adjusted under 35 U.S.C. 154(b) by 17 days.

(21) Appl. No.: 14/004,778

(22) PCT Filed: Mar. 9, 2012

(86) PCT No.: PCT/IB2012/051118
§ 371 (c)(1),
(2), (4) Date: Sep. 12, 2013

(87) PCT Pub. No.: WO2012/127350
PCT Pub. Date: Sep. 27, 2012

(65) Prior Publication Data
US 2014/0004729 A1    Jan. 2, 2014

(30) Foreign Application Priority Data

Mar. 18, 2011 (WO) ................ PCT/CN2011/000438

(51) Int. Cl.
*G06F 1/16* (2006.01)
*H01R 13/46* (2006.01)

(52) U.S. Cl.
CPC .............. *H01R 13/46* (2013.01); *G06F 1/1632* (2013.01)
USPC .................................................. 361/679.42

(58) Field of Classification Search
USPC ................ 439/131–137; 361/679.42, 679.43; 455/572–573
See application file for complete search history.

(56) References Cited

U.S. PATENT DOCUMENTS

| | | | | |
|---|---|---|---|---|
| 5,460,547 | A | * | 10/1995 | Belt et al. ...................... 439/638 |
| 5,933,328 | A | * | 8/1999 | Wallace et al. ............... 361/737 |
| 6,123,557 | A | * | 9/2000 | Wang et al. ................... 439/137 |
| 6,131,018 | A | * | 10/2000 | De Crouy-Chanel et al. ............................... 455/572 |
| 6,264,484 | B1 | * | 7/2001 | Chien et al. ................... 439/152 |
| 6,926,130 | B2 | * | 8/2005 | Skowronski ............. 191/12.2 R |
| 7,889,494 | B2 | * | 2/2011 | Stampfli .................. 361/679.42 |

(Continued)

OTHER PUBLICATIONS

"Review: Dexim p-Flip for IPhone and Ipod Touch" Anonymous, Nov. 10, 2009, retrieved from the Internet : www.geardiary.com/2009/11/10/review-dexim-p-flip-for-iphone-ipod-touch/.

*Primary Examiner* — Chandrika Prasad
(74) *Attorney, Agent, or Firm* — Ryan Kromholz & Manion, S.C.

(57) ABSTRACT

The invention relates to a system (1) for connecting a portable device. The system comprises: —a base portion (3) forming a planar area (4); —a cradle (5) comprising a first portion (6) having a connector (7) extending upwards for connecting the portable device, and a second portion (8) for supporting the portable device when the portable device is connected in the connector (7). The cradle (5) is mounted on the base portion (3) in a rotatable way so as to take a first cradle position in which the first portion (6) extends in the same plan as the planar area (4), and to take a second cradle position in which the second portion (8) extends in the same plan as the planar area (4). When the cradle is in the first cradle position, the first portion of the cradle is in the same plan as the planar area formed by the base portion, which allows the connector to extend upwards this unique plan and to connect with any portable devices independently of their width because no recess exits. Moreover, when the cradle is in the second cradle position, the second portion advantageously acts as a cover which allows to hide the connector.

8 Claims, 10 Drawing Sheets

(56) References Cited

U.S. PATENT DOCUMENTS

| | | | |
|---|---|---|---|
| 8,174,835 B2 * | 5/2012 | Kim et al. | 361/737 |
| 8,427,826 B2 * | 4/2013 | Sullivan | 361/679.43 |
| 8,834,191 B2 * | 9/2014 | Yeh et al. | 439/331 |
| 2004/0129522 A1 | 7/2004 | Skowronski | |
| 2006/0058073 A1 * | 3/2006 | Kim | 455/573 |
| 2010/0312938 A1 | 12/2010 | Stampfli | |

* cited by examiner

CRADLE FOR A PORTABLE DEVICE HAVING A CONNECTOR ROTATABLY MOUNTED ON A BASE

This application is a national stage application under 35 U.S.C. §371 of International Application No. PCT/IB2012/051118 filed on Mar. 9, 2012, which claims the benefit of PCT/CN211/000438 filed on Mar. 18, 2011. These applications are hereby incorporated by reference herein.

FIELD OF THE INVENTION

The invention relates to a system for connecting a portable device, and to an apparatus comprising said system.

The invention may be used in the field of apparatus for displaying multimedia data.

BACKGROUND OF THE INVENTION

Nowadays, there exists various types of portable devices (e.g. mobile phones, portable digital assistants, camcorders, cameras, game consoles . . . ) comprising data storage for storing various multimedia data (e.g. audio, video, text, graphic . . . ). Since such portable devices are of relative small size and poor data display capabilities, users often feel the need to display those multimedia data on apparatus offering better display characteristics, such as a better reproducing sound system, or a larger screen. To achieve this, those apparatus comprise a connecting system, which allows, after a portable device is connected to this connecting system, the transfer of the multimedia data to the apparatus for further display. The connecting system is often put in a recess of the apparatus to avoid this connecting system being too much visible. However, considering that portable devices are of very different types and very different shapes, their connection with those connecting systems is not always possible, for example in case the recess in which the connecting system is placed has a width smaller than the width of the portable device.

OBJECT AND SUMMARY OF THE INVENTION

It is an object of the invention to propose an improved system for connecting a portable device. The invention is defined by the independent claims. The dependent claims define advantageous embodiments.

To this end, the system according to the invention comprises:
  a base portion forming a planar area;
  a cradle comprising a first portion having a connector extending upwards for connecting said portable device, and a second portion for supporting said portable device when said portable device is connected in said connector, said cradle being mounted on said base portion in a rotatable way so as to take:
  a first cradle position in which said first portion extends in the same plan as said planar area,
  a second cradle position in which said second portion extends in the same plan as said planar area.

When the cradle is in the first cradle position, the first portion of the cradle is in the same plan as the planar area formed by the base portion, which allows the connector to extend upwards this unique plan and to connect with any portable devices independently of their width because no recess exits, contrary to the prior art. Moreover, when the cradle is in the second cradle position, the second portion advantageously acts as a cover which allows to hide the connector.

The invention also relates to an apparatus for displaying multimedia data being stored on a portable device, this apparatus comprising a system for connecting a portable device as mentioned above.

Detailed explanations and other aspects of the invention will be given below.

BRIEF DESCRIPTION OF THE DRAWINGS

The particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

Figure 1A:
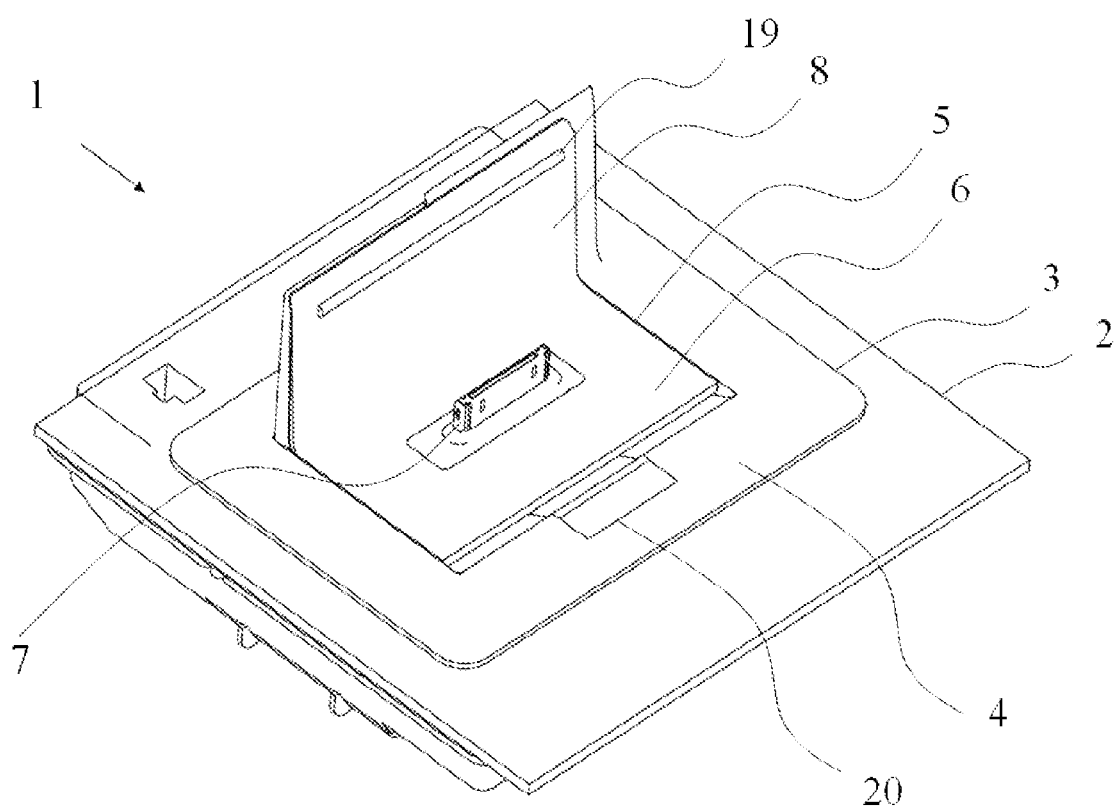
FIG. 1A and FIG. 1B depict two different views of a system according to the invention for connecting a portable device.
Figure 1B:
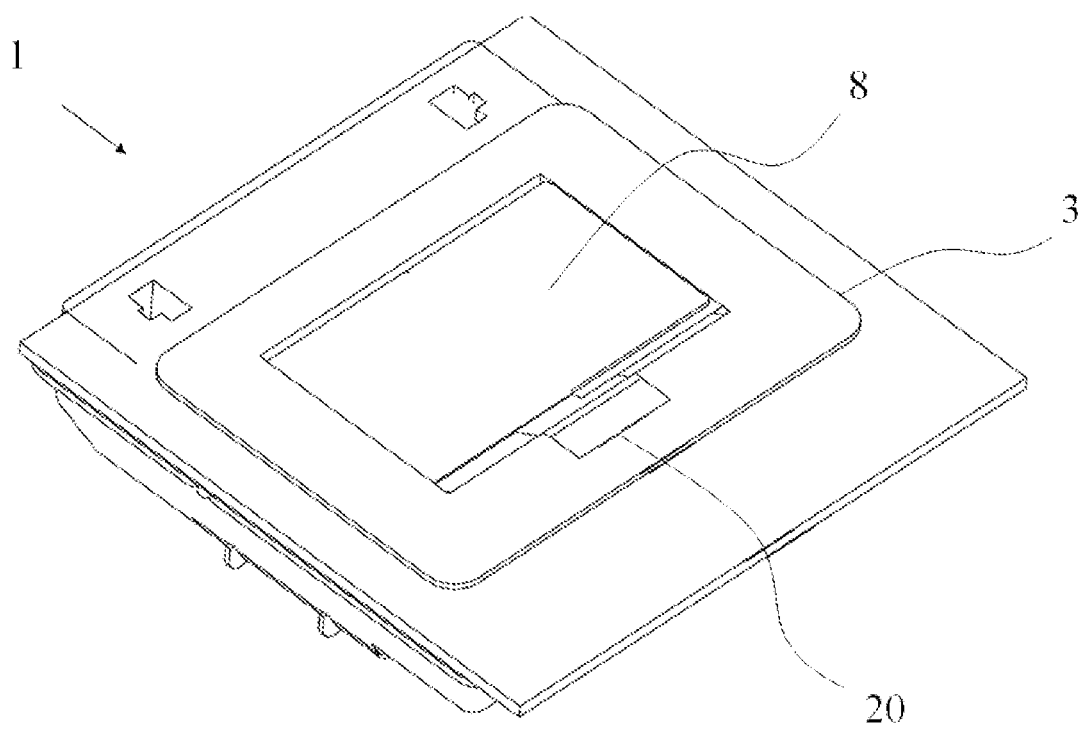

FIG. 1A and FIG. 1B depict two different views of a system 1 according to the invention for connecting a portable device.

The system according to the invention comprises:
  a base portion 3 forming a planar area 4;
  a cradle 5 comprising a first portion 6 having a connector 7 extending upwards for connecting the portable device, and a second portion 8 for supporting the portable device when the portable device is connected in the connector 7.

Preferably, the connector 7 extends vertically compared to the plan defined by the first portion 6.

The cradle 5 is mounted on the base portion 3 in a rotatable way so as to take:
  a first cradle position P1, illustrated by FIG. 1A, in which the first portion 6 extends in the same plan as the planar area 4,
  a second cradle position P2, illustrated by FIG. 1B, in which the second portion 8 extends in the same plan as the planar area 4.

Optionally, the base portion 3 can be fixed on an additional body 2 for supporting all elements of the system according to the invention. It is noted that body 2 and the base portion 3 could form a single element.

Figure 2:
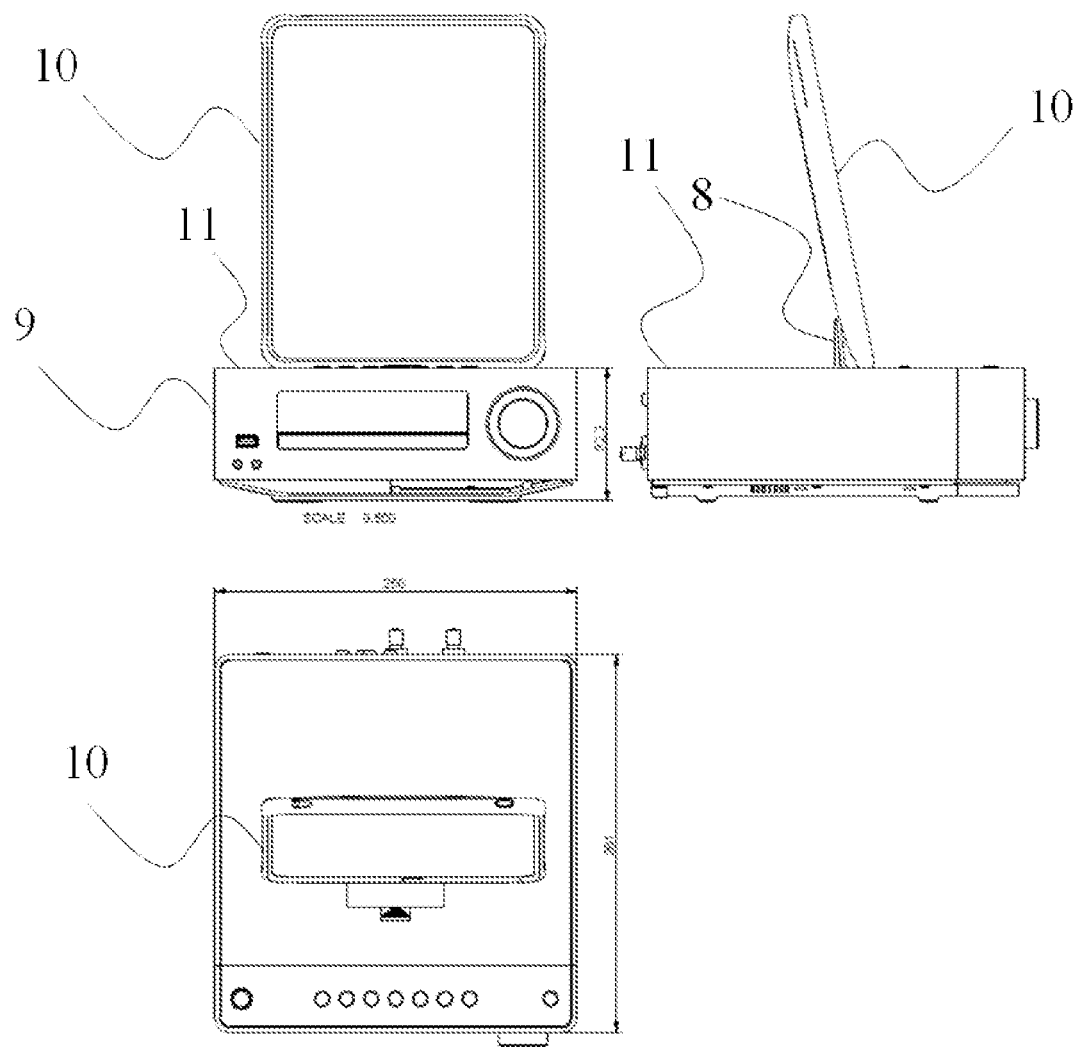
FIG. 2 depicts a system according to the invention when used in an apparatus for displaying multimedia data being stored on a portable device.

FIG. 2 depicts a system 1 according to the invention when used in an apparatus 9 for displaying multimedia data being stored on a portable device 10.

The top-left view depicts the front side of the apparatus 9, the top-right view depicts the left side of the apparatus 9, the bottom-left view depicts the top view of the apparatus 9.

The portable device 10 may correspond to any device (e.g. mobile phones, portable digital assistants, camcorders, cameras, game consoles . . . ) comprising a data storage (not shown) for storing various multimedia data (e.g. audio, video, text, graphic . . . ) being intended to be displayed on the apparatus 9. In the present example, the apparatus may correspond to a sound system connected to a pair of speakers (not shown), to display audio data stored on the portable device 10 when this portable device 10 is connected to the apparatus 9 thanks to the system 1 according to the invention. To this end, the system 1 is mounted on the top surface 11 of the apparatus 9. FIG. 2 illustrates the system 1 in the first cradle position P1 of the cradle 5. In this first cradle position P1, the portable device 10 leans on the second portion 8 which acts as supporting element. The planar area 4 formed by the base portion 3 is parallel or in the same plan as the top surface 11.

Figure 3:
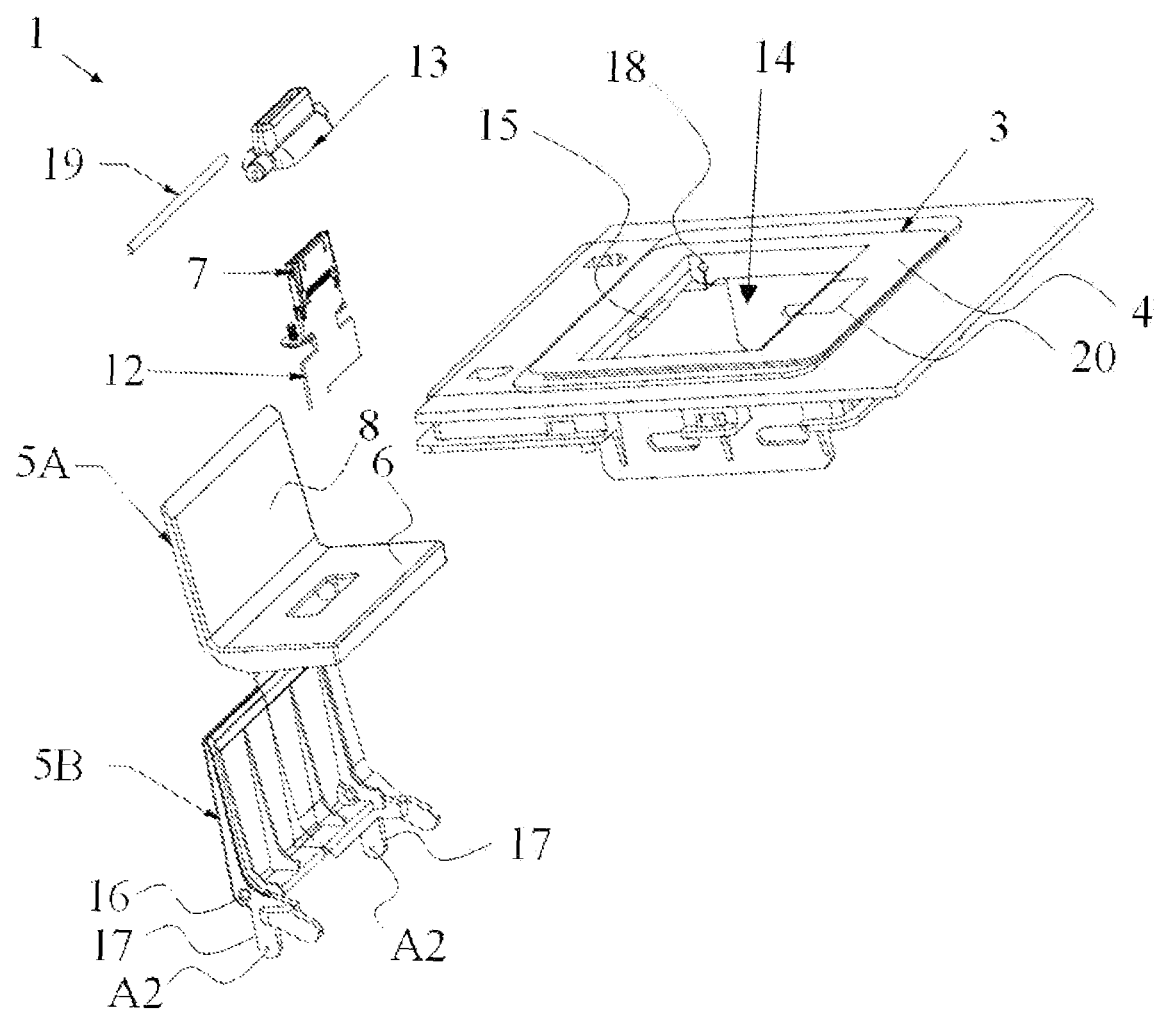
FIG. 3 depicts an exploded view of some elements of a system according to the invention.

FIG. 3 depicts an exploded view of some elements of a system 1 according to the invention. In this view, given as a non-limitative example, the cradle 5 is formed by two elements 5A and 5B cooperating together, preferably to form an L shape. The connector 7 is electrically attached to a printed circuit board 12 to carry electrical connections of the connector 7 to a processing unit (not shown) placed in the apparatus 9 and in charge of receiving and displaying multimedia data stored on the portable device. Advantageously, the first portion 6 and the second portion 8 form an angle in the range [90; 120] degrees, allowing a stable support of the portable device by the second portion 8 when the portable device is connected in the cradle 5.

Advantageously, a connector cover 13 is fixed around the connector 7 to guaranty a sufficient rigidity of connector 7 during the connection of the portable device. The cradle 5 is intended to take place in the hollow area 14 formed in the base portion 3. The rotation of cradle 5 between the first cradle position P1 and the second cradle position P2 is ensured thanks to an axis 15 passing through a longitudinal aperture 16 in the cradle 5, and extending further in two apertures 18 made in the internal sides of the hollow area 14 (only one aperture is represented, the second one being placed opposite).

Advantageously, to avoid damaging (e.g. scratches) the external body of the portable device when leaning on the second portion 8, the second portion 8 comprises a rubber bumper 19 for supporting the portable device when the portable device is connected in the connector 7.

FIG. 4A, FIG. 4B, FIG. 4C, FIG. 4D, FIG. 4E, FIG. 4F depict cross-section views of the system 1 according to the invention, according to different opening angles of the cradle 5 being 0 degree, 25 degrees, 50 degrees, 80 degrees, 85 degrees, 90 degrees, respectively. Angles are calculated between the plan defined by the second portion 8 and the planar area 4.

Advantageously, the system according to the invention further comprises a spring 21 for rotating the cradle 5 from the second cradle position P2 to the first cradle position P1. When the cradle 5 is in the second cradle position P1, the spring 21 creates a force F1 around axis 15 that maintains the second portion 8 in the same plan as planar area 4. When a user starts to rotate the cradle 5 in direction D3, the spring 21 creates a force F2 around axis 15 that triggers to self-rotation of cradle 5, without any need of a user action on cradle 5.

Advantageously, the spring 21 is a torsion spring that can create a 5 Kgf force.

A first end of the spring 21 is attached via a rotatable liaison to an anchor point A1 of the base portion 3, while a second end of the spring 21 is attached via a rotatable liaison to an anchor point A2 placed in some legs 17 of the cradle 5. It is noted that two springs like spring 21 could be used, each spring being positioned on each side of cradle 5.

Advantageously, the system according to the invention further comprises a latch mechanism 20 placed on the base portion 3 and adapted to cooperate with a lock system 26 placed on said first portion 6, to hold said cradle 5 in said first cradle position P1. This is advantageous because this gives more robustness to the cradle when a portable device is being connected in the connector 7, compared to only using the force of the spring 21 holding cradle 5 is the first position P1.

Figure 4A:
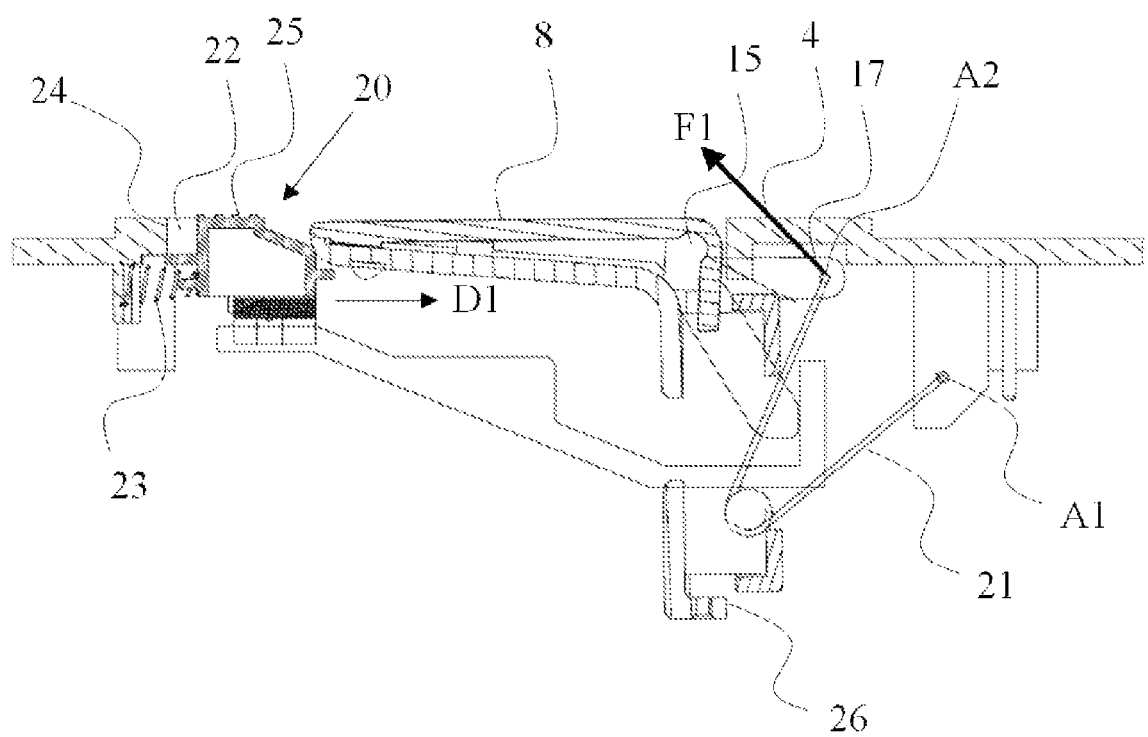
FIG. 4A, FIG. 4B, FIG. 4C, FIG. 4D, FIG. 4E, FIG. 4F depict cross-section views of the system according to the invention.

The latch mechanism 20 is adapted to take a first latch position POS1 and to take a second latch position POS2. FIG. 4A and FIG. 4F represent the latch mechanism 20 is the first latch position POS1, while FIG. 4B, FIG. 4C, FIG. 4D and FIG. 4E represent the latch mechanism 20 is the second latch position POS2.

The latch mechanism 20 comprises a button 25 adapted to slide into a cavity 22 of the base portion 4. It also comprises a return spring 23 disposed into the cavity to create a force along direction D1, resulting in the button reaching a final position at a given distance from the back-wall 24 of the cavity.

As illustrated in FIG. 4A, when no external forces are generated on the latch mechanism 20 via the button 25, the latch mechanism 20 in the first latch position POS1.

Figure 4B:
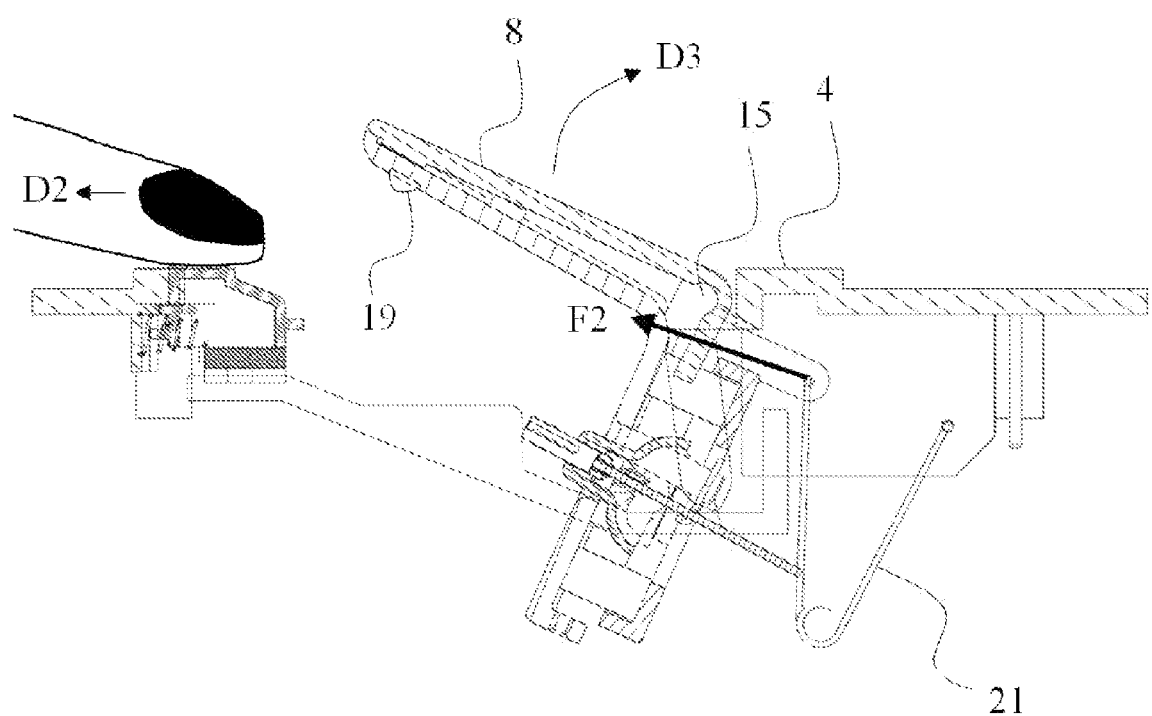
Figure 4C:
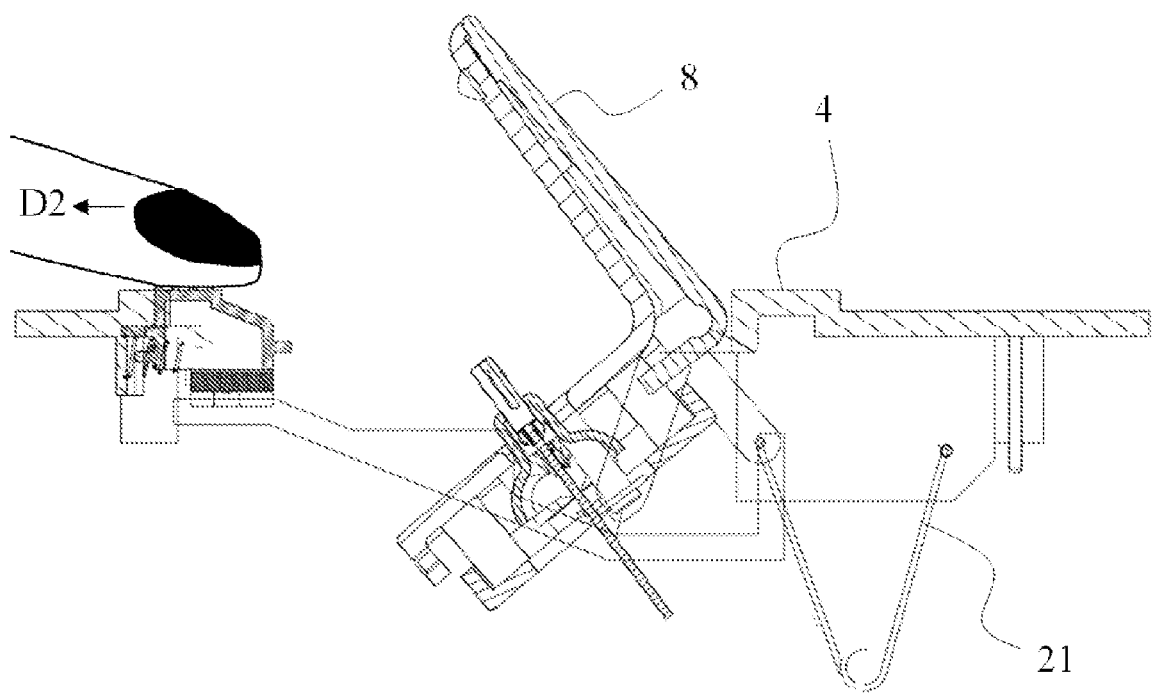
Figure 4D:
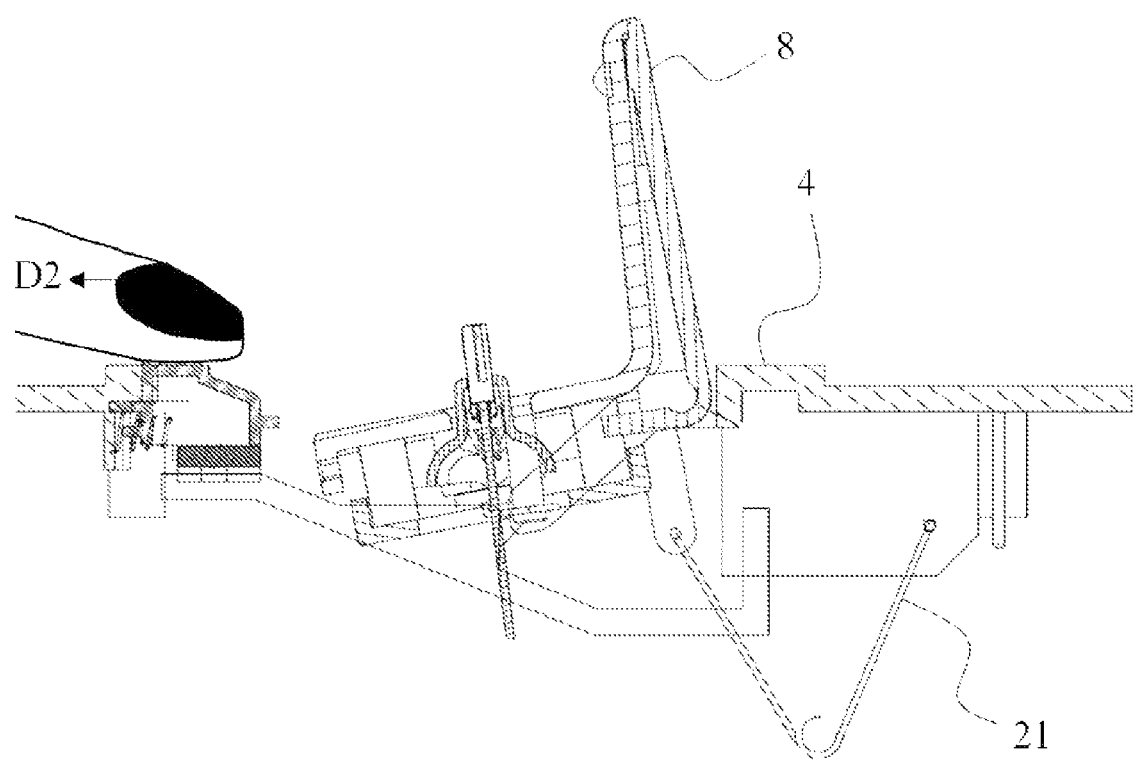
Figure 4E:
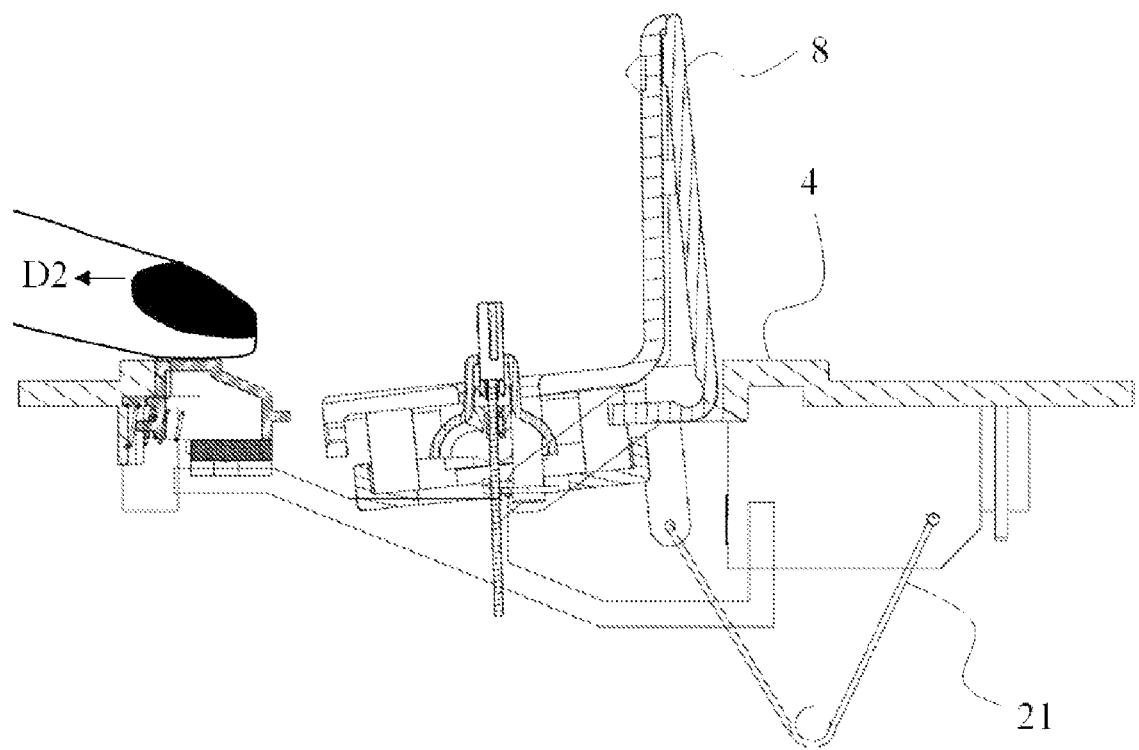
Figure 4F:
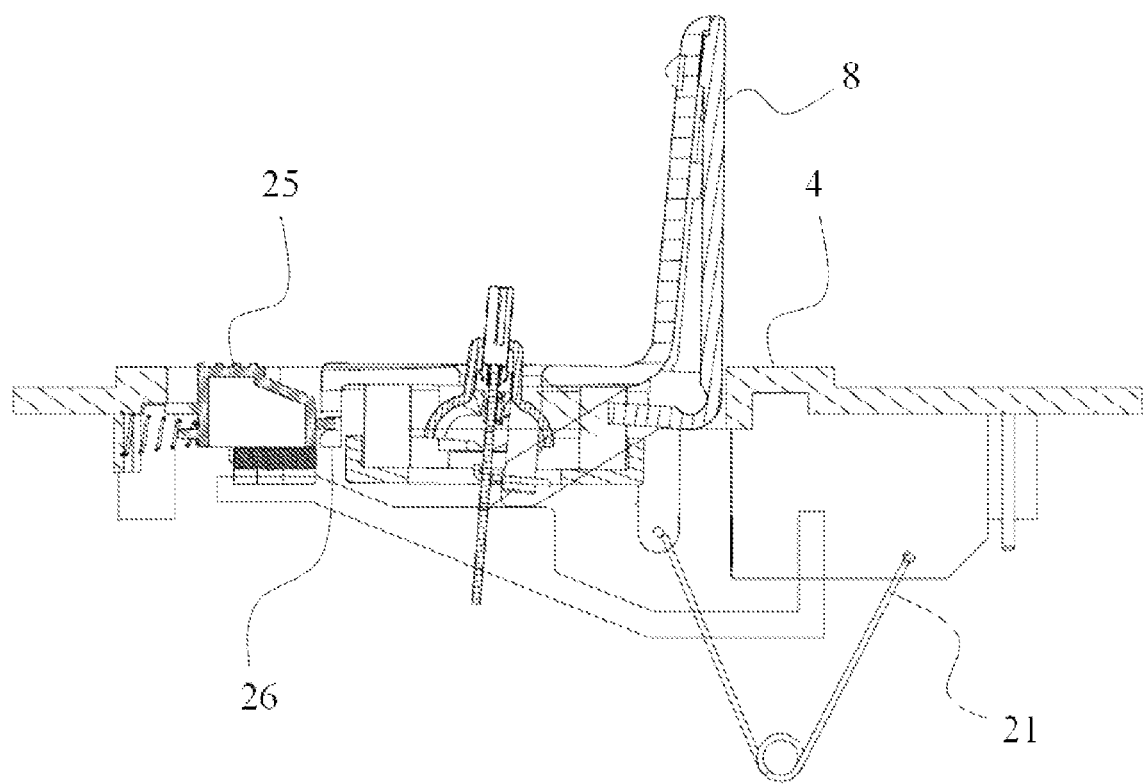

As illustrated in FIG. 4B, when an external force is generated on the latch mechanism 20 via the button 25 along direction D2, this force counteracts the force of the return spring 23, so that the button 25 is pulled-back into the cavity 22 until touching wall 24, resulting in the latch mechanism reaching the second latch position POS2.

During the rotation of the cradle 5, user may advantageously create a force along direction D2 on the latch mechanism 20 until the cradle 5 reaches the first cradle position P1, then stop generate a force along direction D2 to allow the cooperation of the button 25 and the lock system 26, resulting in blocking the cradle 5 in the first cradle position POS1.

As illustrated in FIG. 4B, the lock system 26 may for example comprise a small cavity intended to cooperate with a protruding part of the button 25.

When the cradle 5 is in the first cradle position P1, the user can easily connect a portable device in the connector 7 because the connector 7 extends upwards planar area 4.

The amplitude of the rotation of the cradle corresponds to the angle between the first portion 6 and the second portion 8, so preferably in the range [90; 120] degrees.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A system for connecting a portable device, said system comprising:
   a base portion forming a planar area;
   a cradle comprising a first portion having a connector extending upwards for connecting said portable device, and a second portion for supporting said portable device when said portable device is connected in said connector, said cradle being mounted on said base portion in a rotatable way so as to take:
   a first cradle position in which said first portion extends in the same plan as said planar area
   a second cradle position in which said second portion extends in the same plan as said planar area, wherein in the second cradle position the second portion acts as cover for covering the connector.

2. A system as claimed in claim 1, further comprising a spring for rotating said cradle from said second cradle position to said first cradle position.

3. A system as claimed in claim 2, wherein said spring is a torsion spring.

4. A system as claimed in claim 1, further comprising a latch mechanism placed on the base portion and adapted to cooperate with a lock system placed on said first portion, to hold said cradle in said first cradle position.

5. A system as claimed in claim 1, wherein said first portion and said second portion form an angle in the range [90; 120] degrees.

6. A system as claimed in claim 1, wherein said second portion comprises a rubber bumper for supporting said portable device when said portable device is connected in said connector.

7. An apparatus for displaying multimedia data being stored on a portable device, said apparatus comprising a system as claimed in claim 1 for connecting said portable device to said apparatus.

8. A system as claimed in claim 1, wherein the base portion comprises a hollow area, the cradle being positioned in the hollow are in the second cradle position.

\* \* \* \* \*